G. W. PUTNAM.
WATER VESSEL FOR STEAM FIREPROOF SAFES.
No. 104,352.      Patented June 14, 1870.
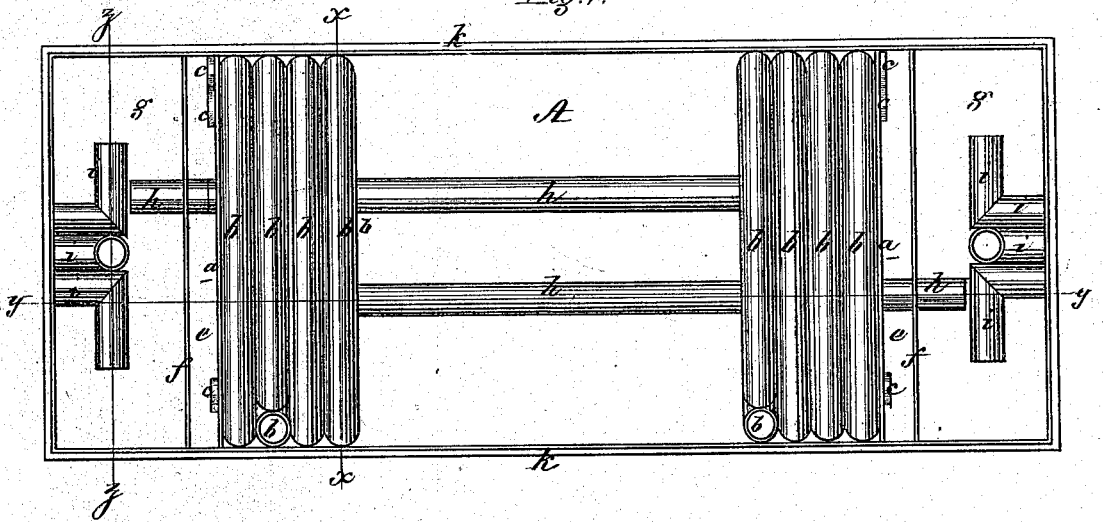
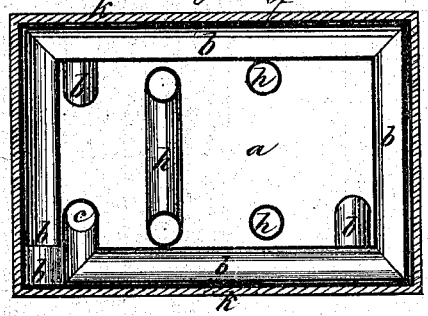 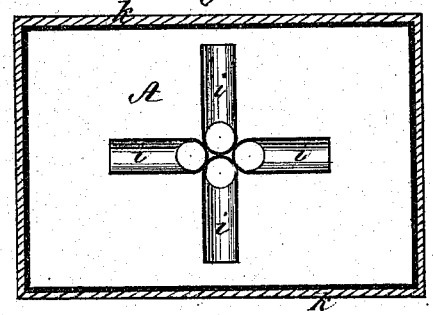
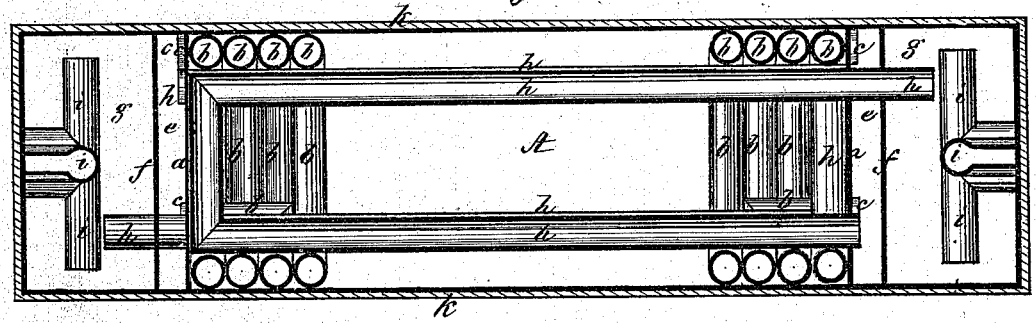
Witnesses:      Inventor,
George W. Putnam.

United States Patent Office.

GEORGE W. PUTNAM, OF BILLERICA, MASSACHUSETTS.

Letters Patent No. 104,352, dated June 14, 1870.

IMPROVEMENT IN WATER-VESSELS FOR STEAM FIRE-PROOF SAFES.

The Schedule referred to in these Letters Patent and making part of the same

*To all whom it may concern:*

Be it known that I, GEORGE W. PUTNAM, of Billerica, in the county of Middlesex and State of Massachusetts, have invented an Improved Water-Vessel for Steam Fire-proof Safes, of which the following is a full, clear, and exact description, reference being had to the accompanying drawing making part of this specification, in which—

Figure 1 is a plan of my improved water-vessel, the top being removed to show the interior construction.

Figure 2 is a transverse vertical section through the same, on the line $x\,x$ of fig. 1.

Figure 3 is a longitudinal vertical section through the same, on the line $y\,y$ of fig. 1.

Figure 4 is a transverse vertical section on the line $z\,z$ of fig. 1.

In that class of safes known as steam fire-proof safes, the water-vessels have heretofore been only half filled, the arrangement of pipes within these vessels being such that, if they were more than half filled, the excess of water would escape, in the event of the safe being thrown into certain positions by being precipitated, in a conflagration, from the floor on which it originally stood.

My invention has for its object to enable me to nearly fill the vessels with water, without any liability of its escaping therefrom in any position into which they may be thrown, thus securing the advantage of having a larger quantity of water within the safe than heretofore, which is of great importance, in extensive conflagrations, where it is desirable to prolong the generation of steam as much as possible; and My invention consists in a peculiar arrangement of pipes or passages and chambers within the vessel, which admits of its being nearly filled with water, without any liability of its escaping therefrom, whatever may be its position, in consequence of the safe being overturned or thrown from the place where it originally stood.

To enable others skilled in the art to understand and use my invention, I will proceed to describe the manner in which I have carried it out.

In the said drawing—

A represents a vessel, made of copper, tin, or other suitable material, and of a proper size to fit into the safe to which it is to be applied, that portion between the partitions $a\,a$ being intended to be very nearly filled with water.

Near each end of this vessel A are placed one, two, or more small pipes, $b\,b\,b\,b$, which I call encompassing or angle-pipes, as they are provided with angles or bends.

One end of each of these pipes is fitted into an orifice, at $c$, near one corner of the partition $a$, and secured in place by means of solder.

The arrangement of the pipes $b$ being the same at each end of the vessel, I will describe those at one end only.

Each pipe $b$ extends transversely around the vessel A, touching the sides thereof, and returns to the corner from which it started.

It will be seen that, if that corner 6, from which one of the encompassing-pipes $b$ started, is above the water-level, this pipe, whose inside end 6 is at that corner, cannot be choked with water, but will be free to receive the collected steam (generated by the heat of a conflagration) which is in the space above the boiling water in the vessel A, and will convey the steam out of its other end $c$, which is soldered to the partition $a$, as before stated.

If the position of the safe should be changed, so as to bring the corner which was above the water-level below the same, the water will enter the pipe $b$, but cannot pass entirely around and through it, for the reason that it cannot rise above its level in the vessel A, and as the pipe passes transversely around the interior of this vessel, it must necessarily, at one or more of the angles or bends, pass above the water-level, and the water which entered the pipe will only flow a short distance therein, as it cannot rise over the corner or angle in the pipe which is above the water-level, and is thus prevented from escaping, as required.

By arranging the pipes $b$, as above described, so that they will encompass or surround a portion of the water within the vessel A, instead of going through it, one or more of their mouths or inlets 6 will always be above the water-level and open, when the vessel A is in any position, except inverted, and through the inlet or inlets thus provided, the steam from the boiling water will pass away from the interior of the vessel A.

The encompassing-pipes $b\,b$ may, if desired, be somewhat varied in position.

It may not always be necessary that the inner end of each pipe should return to the corner from which it started, but it may extend in any desired direction, which shall encompass the water, and present the necessary angles or bends above the water-level, to prevent the escape of the water, a sufficient number of these angles, corners, or bends in the pipes $b\,b$ (or their equivalent water and steam passages) being always provided to secure, in every case, the desired result.

At each end of the vessel A is a small chamber, $e$, formed by the partitions $a$ $f$, and extending across the vessel A, and within this chamber are the ends or outlets $c$ of all four of the encompassing-pipes $b$ $b$ $b$ $b$.

In addition to the small chamber $e$, above described, there is, at each end of the vessel A, a larger chamber, $g$, between the partition $f$ and the end of the vessel A. These chambers $e$ and $g$ are each separate from each other and from the body of the vessel A, which contains the water.

Each of the smaller chambers $e$ is provided with a long conducting-pipe, $h$, and the steam, which passes through the encompassing-pipes $b$ $b$ into the small chamber $e$, goes from said small chamber into the conducting-pipe $h$, and through said pipe into the large chamber $g$, at the end of the vessel A. Each of the pipes $h$ may, if desired, consist of a single straight piece, but I prefer to have it double or return, for the reason that, by so doing, it becomes necessary for the safe to turn upside down twice, at least, before any water will pass into the large chamber $g$. By returning or doubling it twice or three times, the safe would have to turn upside down a corresponding number of times before any water would enter the chamber $g$, but, in a conflagration, a safe is not liable to turn more than once. The conducting-pipe $h$, when doubled or returned, is made with angles or corners also, so as to increase the difficulty of getting any water through it into the chamber $g$. The object of this conducting-pipe $h$ is to open a communication between the encompassing-pipes $b$ $b$ and the chamber $g$, and to collect and convey the steam which comes through the encompassing-pipes into said chamber $g$, for its free discharge into the interior of the safe. This conducting-pipe may, in fact, be considered as only a continuation of the encompassing-pipes, as the small chamber $e$ is used only for the purpose of connecting the encompassing or angle-pipes $b$ $b$ with the conducting-pipe $h$. By joining the outlets of the encompassing-pipes to the conducting-pipe, the small chamber $e$ could, however, be dispensed with.

Both the large chambers $g$ $g$ (one of which, as before described, is placed at each end of the vessel A) are provided with one or more discharge-pipes, $i$ $i$, which communicate with the air outside the vessel A, and these pipes $i$ $i$ convey the steam which comes through the conducting-pipes $h$ $h$, into the chambers $g$ $g$, out into the interior of the safe, for the protection of the books, papers, and other contents thereof. The object of the chambers $g$ $g$ is to catch any water which may escape from the vessel A through the conducting-pipes $h$ $h$, in consequence of changes in the position of the safe, and retain said water until it is converted into steam, thus utilizing all the water. These chambers $g$ $g$ also receive, through the conducting-pipes $h$ $h$, the steam which is generated in the body of the vessel A, and all the steam passes from these chambers into the interior of the safe, through the steam-discharge pipes $i$ $i$.

The orifice, through which I fill the vessel A with water or other steam-generating fluid, I place in the side of the vessel, or in any convenient position, and, after filling the vessel, the orifice is closed and tightly soldered up.

Having thus described my water-vessel A in its first or normal position, I will now suppose that, in consequence of the burning away, in a conflagration, of the floor on which the safe stands, the safe itself is precipitated into the cellar below, and alights in an inverted position, which position also inverts the water-vessel A.

When the vessel A stood in the position first described, the pipes $b$ $b$ and chamber $e$, at its lower end, were filled with water, which rose in the conducting-pipe $h$, (which issues from said chamber $e$,) as far as the water-level, but no further.

By the inversion of the safe, what was originally the upper end of the vessel A now becomes its lower end, and the chamber $e$, which is now uppermost, and its pipe $h$, consequently have now a small quantity of water in them, which water (excepting what runs back into the vessel A) will be thrown into the large chamber $g$, and will there be converted into steam during a conflagration, and this steam will pass off, with the rest of the steam, through the discharge-pipes $i$ $i$ into the interior of the safe.

The discharge-pipes $i$ $i$ are separate pipes grouped together, and they are so arranged that, if any water should enter the chambers $g$ $g$, in consequence of changes in the position of the safe, the mouth of one or more of these discharge-pipes $i$ $i$ will always be above the surface of the water in the chamber $g$, and will be free to carry off, into the interior of the safe, the steam generated from this small quantity of water in the chamber $g$, as well as all the steam which comes into this chamber, through the conducting-pipe $h$, from the water in the body of the vessel A. I do not confine myself, however, to the use of a group of four discharge-pipes, as a less number than four could be used, if desired.

It is, of course, desirable that as little water as possible should leave the body of the vessel A, in consequence of any change in the position of the safe, and this escape of the water is effectually guarded against by the employment of the encompassing-pipes or angle-pipes $b$ $b$, as it requires several turns of the safe to force any water through them, and the little which would get through will be retained in the chamber $g$, and there be converted into steam.

The main principle of my invention is contained in the encompassing or angle-pipes $b$ $b$, the philosophical basis of the whole arrangement being the well-known fact that water will not rise above the level of its source or fountain.

I close the inner or outer mouths of the discharge-pipes $i$ $i$ with plugs of the fusible alloy in common use, or other equivalent arrangement, so as to prevent any dampness from entering the safe. This alloy will melt at a low temperature, so that, in a conflagration, the pipes $i$ $i$ will always be free to convey the steam into the interior of the safe.

It will be seen, from the above description, that I have provided for the free escape of the steam into the interior of the safe, and the saving and utilizing, by means of pipes and chambers, of all the water, let the position of the water-vessel be what it may, in consequence of any changes in the position of the safe.

My invention, as above described, is superior to all others, for the following reason, viz: The best water-vessels for steam fire-proof safes heretofore invented are only intended to be filled half full of water. If more water is put in, it will run out in certain positions, leaving the vessel but half full. My improved water-vessel may be nearly filled with water between the partitions $a$ $a$, and, in practice, the chambers $g$ $g$ may be made so small as to occupy very little space within the vessel A, and, by means of the encompassing-pipes or angle-pipes $b$ $b$, the conducting-pipes $h$, and chambers $g$, all the water will be retained and utilized. This, of course, is a very important consideration, for, in a conflagration of long continuance, every drop of water may be needed for the protection of the contents of the safe.

To prevent corrosion from the long standing of water in the water-vessels, a cement of coal-tar and plaster of Paris, or sand, or pulverized marble, &c., may be put all over the inside of the vessels.

It is a well-known fact that a vessel made of metal, glass, or porcelain, when filled with water, will sometimes be covered outside with moisture, which condenses thereon, under certain conditions of the atmosphere, viz: when the surrounding atmosphere is warmer than the vessel and its contents of cold water. This is sometimes the condition of the water-vessels placed in fire-proof safes, and the moisture on the outside of the water-vessels will then pass to the books, papers, &c., in the interior of the safe, injuring the same by making them damp and moldy.

To prevent this condensation of moisture, I place on the outside of the vessel woolen cloth or felting $k$. This covering of cloth, &c., will effectually prevent the condensation of moisture above mentioned, the cloth, &c., being a non-conductor of heat, and, being interposed between the cold surface of the vessel and the warmer atmosphere which surrounds it, will prevent the moisture of the air from condensing on the surface of the water-vessel; or, instead of the cloth or felting above mentioned, the outside of the water-vessel may be covered with oil, paint, or other suitable adhesive substance, and "flock" or ground woolen rags, &c., sprinkled over it before it has dried, which will thus form a coating similar to cloth or felting, which will answer the same purpose, and prevent the condensation of moisture or vapor on the outside of the water-vessel.

Claims.

What I claim as my invention, and desire to secure by Letters Patent, is—

1. The water-vessel A, with or without the chambers $e\ e$, in combination with the pipes $b\ b$ and $h\ h$, chambers $g$, and steam-discharge pipes $i\ i$, constructed and operating substantially as and for the purpose set forth.

2. The water-vessel A, in combination with the pipes $b\ b$ and the pipes $h\ h$, either double or single, operating substantially as and for the purpose described 3. The water-vessel A, in combination with suitable conducting-pipes, as constructed, and a chamber, $g$, at each end, substantially as and for the purpose described.

Witness my hand this 6th day of May, A. D. 1870.

GEORGE W. PUTNAM.

Witnesses:
P. E. TESCHEMACHER,
W. J. CAMBRIDGE.